(12) United States Patent
MacBride

(10) Patent No.: US 6,823,383 B2
(45) Date of Patent: Nov. 23, 2004

(54) STEALTH NETWORK

(75) Inventor: Robert F. MacBride, Glen Allen, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

(21) Appl. No.: 10/238,765

(22) Filed: Sep. 10, 2002

(65) Prior Publication Data

US 2004/0049602 A1 Mar. 11, 2004

(51) Int. Cl.[7] .................. G06F 15/173; G06F 11/30; G06F 12/24
(52) U.S. Cl. ................ 709/224; 713/200; 713/201
(58) Field of Search ................. 709/316, 224, 709/207; 370/252, 389, 316, 245; 307/43; 707/102; 714/4; 713/200, 201

(56) References Cited

U.S. PATENT DOCUMENTS

| | | | |
|---|---|---|---|
| 5,541,911 A | | 7/1996 | Nilakantan et al. |
| 5,600,632 A | * | 2/1997 | Schulman .................. 370/252 |
| 5,828,468 A | | 10/1998 | Lee et al. |
| 5,991,881 A | | 11/1999 | Conklin et al. |
| 6,118,188 A | * | 9/2000 | Youssef .................. 307/43 |
| 6,363,489 B1 | | 3/2002 | Comay et al. |
| 6,545,982 B1 | * | 4/2003 | Murthy et al. .............. 370/245 |
| 2002/0006116 A1 | * | 1/2002 | Burkhart .................. 370/316 |
| 2002/0032774 A1 | | 3/2002 | Kohler, Jr. et al. |
| 2002/0083077 A1 | * | 6/2002 | Vardi .................... 707/102 |
| 2003/0043755 A1 | * | 3/2003 | Mitchell ................. 370/252 |
| 2003/0120826 A1 | * | 6/2003 | Shay ..................... 709/316 |
| 2003/0142666 A1 | * | 7/2003 | Bonney et al. ............. 370/389 |

FOREIGN PATENT DOCUMENTS

WO    WO 01/60025    8/2001

* cited by examiner

Primary Examiner—John Follansbee
Assistant Examiner—Kenny Lin
(74) Attorney, Agent, or Firm—Baker & McKenzie

(57) ABSTRACT

Described in this application is a system and device in which taps, which mirror or provide a copy of network traffic, are connected to monitoring equipment through shadowing units, which pass data to the monitoring equipment but block outbound data transmissions from the monitoring equipment. Aggregation/dissemination units are provided to aggregate and/or disseminate tapped data network signals to the monitoring equipment. Also provided are bypass controllers that can either route the tapped data network signals directly to the monitoring equipment or route such signals through the aggregation/dissemination units.

18 Claims, 4 Drawing Sheets

STEALTH NETWORK

FIELD

Secure network architectures with monitoring systems configured to detect hackers.

BACKGROUND

Monitoring equipment such as network "sniffers", protocol analyzers, intrusion detection systems, network forensics systems, or other network analysis systems can be connected to data networks to monitor for intrusion, hackers, or other types of network problems. By connecting such equipment to a network, however, there is a danger that the security of the monitoring equipment itself can become compromised. In other words, there is a danger that a hacker could detect the existence of the monitoring equipment and jam or otherwise control or disrupt the operation of that equipment.

SUMMARY OF THE INVENTION

Described in this application is a system and device in which taps, which mirror or provide a copy of network traffic, are connected to monitoring equipment through shadowing units. The shadowing units allow inbound traffic from the first network to be passed, substantially unaltered, to the monitoring equipment, but block outbound transmissions from the monitoring equipment side of the shadowing units.

The shadowing units are connected through bypass switches, which allow the signals to either pass through an aggregation/dissemination unit to one or more monitoring units, or directly to the monitoring units. The selective bypassing allows the traffic that must be handled by the aggregation/dissemination unit to be controlled to account for traffic load or other variables.

DETAILED DESCRIPTION

Figure 1A:
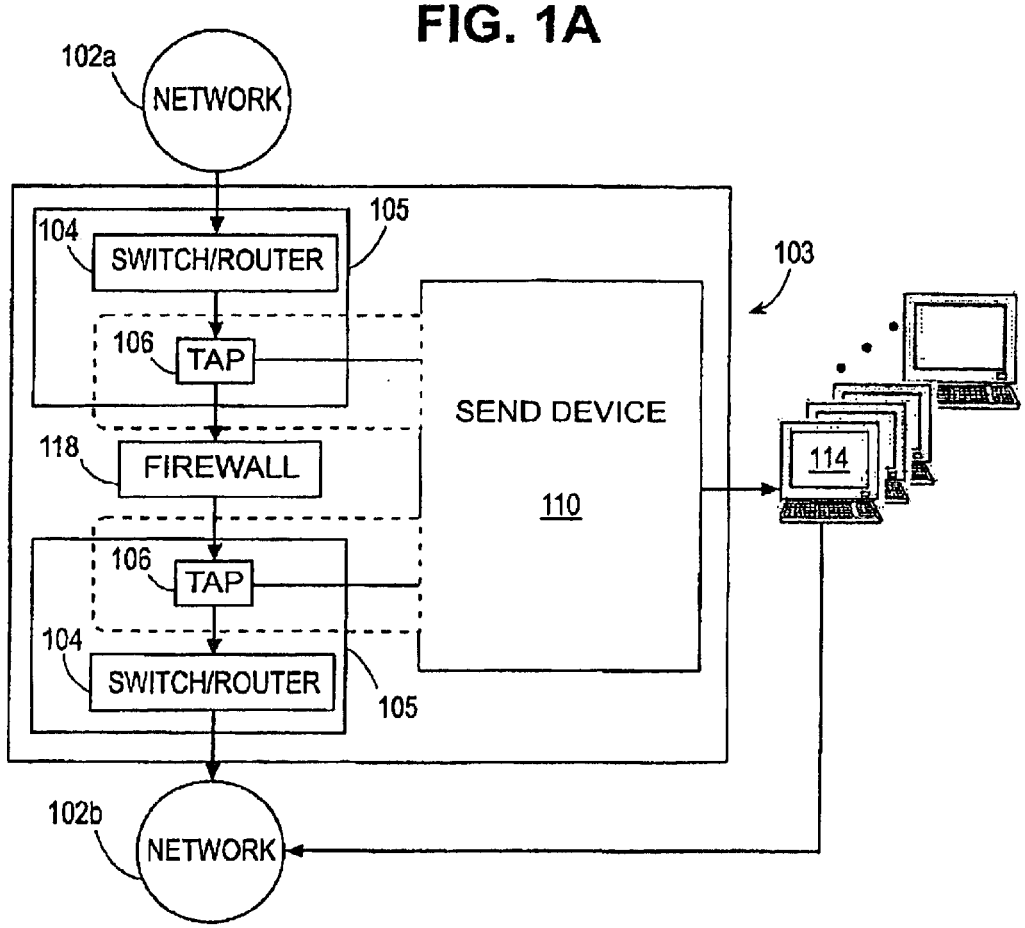
FIGS. 1A–1B illustrates exemplary monitored interfaces between two computer networks.

FIG. 1A is a network architecture diagram, showing multiple networks 102. The security/monitoring equipment 100 illustrated in FIG. 1A provides monitoring of the networks 102 and the traffic between those networks 102. More specifically, the monitoring equipment 100 provides a system and method to protect and/or monitor a network 102 from attacks of the network by external "hackers."

The monitoring equipment 114 is shown in this embodiment at an interface 103 between computer networks 102. The monitoring equipment 114, however, does not need to be located specifically at a network interface. The systems, devices and method described in this application can be used effectively for network protection and monitoring while connected to a data network at any location.

Embodiments described in this application allow for the secure aggregation and/or dissemination of network traffic for monitoring. The monitoring equipment 114 is connected to the networks 102 through the interface 103. This connection is made through network devices such as switches or routers 104 or through other network devices. The connections to those devices are functionally made by taps 106. The function of the taps 106 could be included within network switches or routers 104, or it could be provided through separate devices connected at the outputs of those network devices 104.

The outputs from the taps 106 are provided to shadowing units 108, which provide unidirectional connections for in-system monitoring of network traffic. The shadowing units 108 are within a SEND device 110, which also includes a switch 112 that can provide the aggregation and/or dissemination of tapped signals from the various networks 102 being monitored. Depending on system requirements, the switch 112, which is described more generally as a Traffic Aggregation/Dissemination Unit ("TADU") 112 below, provides a single output or multiple outputs to one or more monitoring systems 114. The function provided by the switch 112 can accordingly be more complex than just switching, and can provide a hybrid of aggregation and dissemination simultaneously, again, according to system design requirements. The monitoring systems 114 can provide intrusion detection, forensics logging, or network "sniffing" functionality to detect hacking attempts, or can provide other network monitoring to detect other network traffic irregularities.

The functionality of the switch 112 could also be provided within a network hub, tap, or router. In general, the function of the taps 106 and switches 112 are to provide selective traffic mirroring, whereby the traffic stream is copied to a monitoring system. Thus, the tap 106 makes a duplicate of the traffic stream and sends it through the shadowing unit 108 into the monitoring device 114. The network devices 104 can, also, have taps 106 built into them. For example, a span port or an equivalent type of connection can be provided in a network device 104 and that span port can provide mirrored traffic at certain span port outputs. The networks monitored could be Internet-type networks, but they could alternatively be proprietary networks or private commercial networks.

The interface 103 and the associated monitoring equipment 100 can be interposed between any two points within a network 102 or placed at an interface between a networks 102. The interface 103 could be between two different company networks, between two different ISPs, it could be between the overall network 102 of one country and the overall network 102 of another country. The interface 103 could also be provided between a switched network and a dial-up network, or it could provide an interface to a Virtual Private Network ("VPN").

Figure 1B:
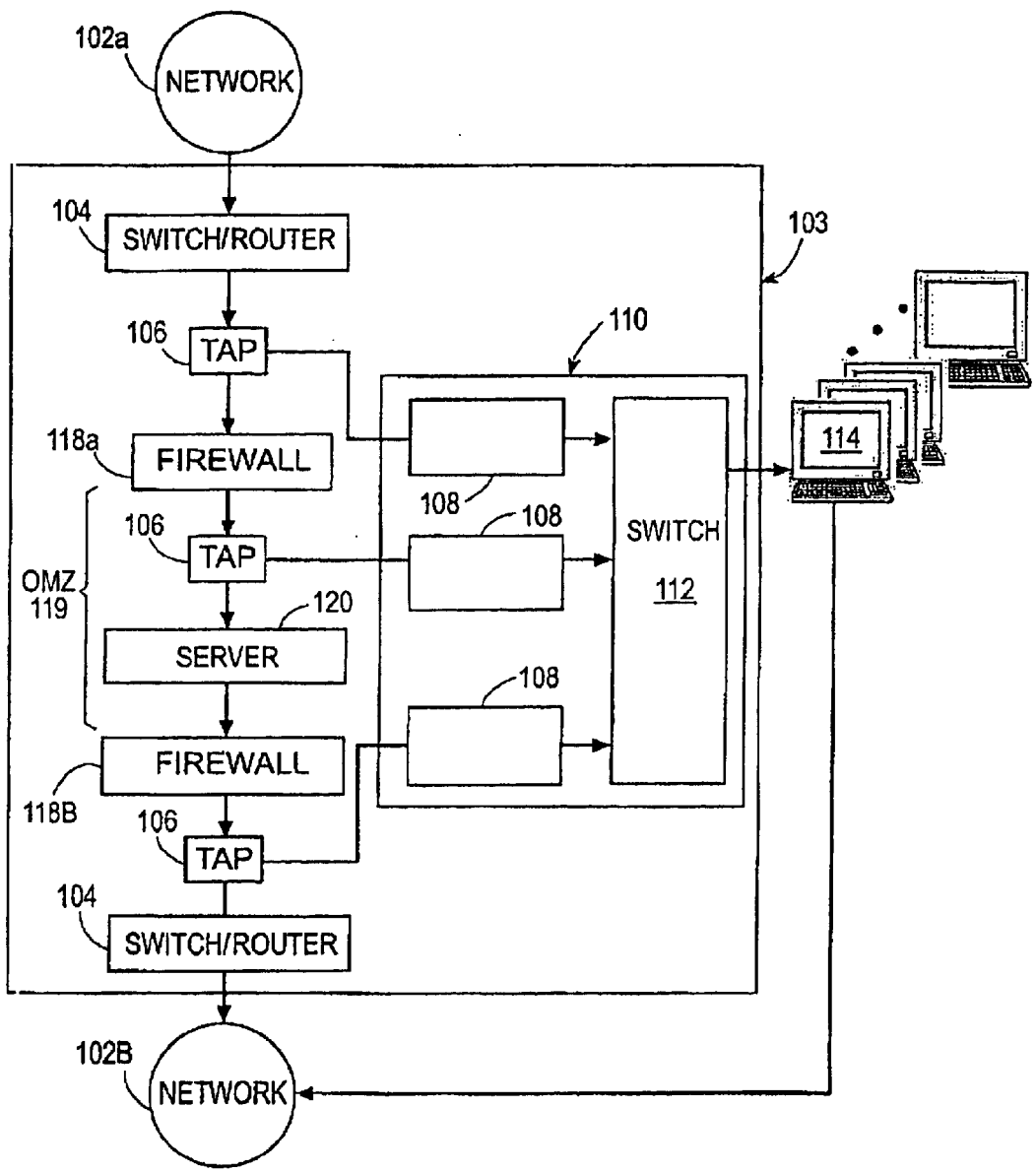

As is shown in FIG. 1B, the tap 106/firewall 118 arrangement can include a De-Militarized Zone ("DMZ") 119, which in this context is the network space or area between two firewalls 118a,b. Specifically, in some applications a first firewall 118a can be provided at an interface to a first network 102. A second firewall 118b can be provided behind the first firewall 118a. The two firewalls 118a,b can be provided to allow, for example, a web server to be placed in the DMZ 119, which is the network space between the first and second firewalls 118a,b, so that if a hacker gets past the first firewall 118a and hacks the web server 120, then there is still another firewall 118b between the web server 120 and the second network 102b.

The embodiments described here allow one tap 106 to be placed outside the firewall 118a, one in the DMZ 119, and one on the second network, outside firewall 118b. In this approach, then, two of the taps are placed outside the network space between the two firewalls 118a,b and one of the taps is placed within the network space that is defined within the two firewalls 118a,b or DMZ 119. The embodiments described here further provide for the selective aggregation and/or dissemination of network traffic from multiple other taps, which can be placed on the networks, at the network interface, and at other locations if desired.

In the above described embodiments, as in other embodiments described below, for ease of understanding the network traffic is shown generally flowing in one direction from a first network 102a to a second network 102b. In most networks, however, the flow of network traffic is bi-directional. It should be understood, accordingly, that the monitoring systems shown and described here provide bi-directional monitoring for traffic moving in both directions at points between and/or within communications networks 102.

Figure 2:
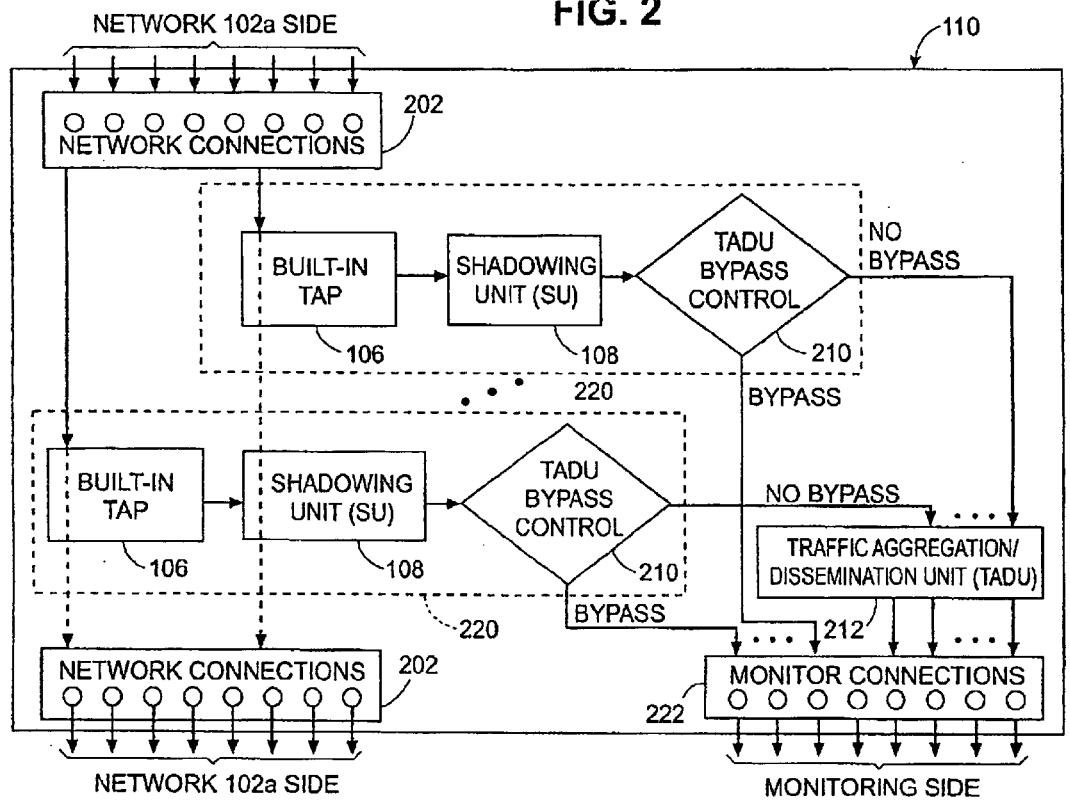
FIG. 2 illustrates a block diagram of an embodiment of a Stealth Enabled Network Device ("SEND device") that is connected to the networks and that can securely aggregate and/or disseminate tapped signals for monitoring of those networks.

FIG. 2 shows a SEND device 110, which has network connections 202 and built-in taps 106. The built-in taps 106 pull off a copy of the network traffic from first network 102a and provide the copied traffic to the shadowing units 108. The network connections 202 receive the traffic from switches, routers or other network elements 104. The SEND device 110 is shown in this embodiment as having built-in taps 106, which is an embodiment that corresponds with the approach shown in FIG. 1A in which the taps 106 are enclosed within the dashed lines extending the perimeter of the SEND device 110. The taps 106 may optionally be kept outside the SEND device 110, in which case the shadowing devices 108 would be connected directly to the "network" connections 202, which in this case would actually receive the mirrored network traffic from the external taps 106. In this optional embodiment, since the taps 106 would already have mirrored the network traffic, only one set of network connections 202 would be generally used as a part of the SEND device 110. Thus, a single network connection 202, receiving the mirrored network traffic from the taps 106, would suffice.

Still referring to FIG. 2, at the output of the shadowing units 108, TADU Bypass Controllers 210 are provided. The TADU Bypass Controllers 210 route traffic to be monitored alternatively through or around a Traffic Aggregation/Dissemination Unit ("TADU") 112. As indicated by its name, "Aggregation/Dissemination," the TADU 112 can aggregate multiple traffic channels to be sent to the monitoring equipment 114 or it can disseminate multiple traffic channels to multiple traffic monitors 114. The TADU Bypass Controllers 210 are operational to selectively bypass the TADUs 112 and send the mirrored traffic directly to the monitors 114 through the monitor connections 222. This function may be desirable if the load becomes too great on the TADU 112 due to the large amounts of traffic that must be combined and/or separated by the TADU 112.

Still referring to FIG. 2, and with further reference to the TADU Bypass Controllers 210, as was previously discussed in embodiments described in the present application, taps 106 may be placed at multiple locations at a network interface and/or on different networks. Through switching of the TADU Bypass Controllers 210, the traffic tapped from these different locations can be selectively through or around the TADUs 112, depending on the loading of the TADUs 112 or other factors.

As shown in the embodiment of FIG. 2, in the SEND device 110 there are multiple sets of taps 106, shadowing units 108, and TADU Bypass Controllers 210. The TADU 112 serves to aggregate or combine the data streams passed on to it from the different TADU Bypass Controllers 210. There could be multiple tap-shadowing unit-Bypass Controller sets 220, from one up to any number of such sets 220 within a single SEND device 110. As mentioned, there could be provided one or multiple monitors 114 at the monitor connections. Depending on network loading or other factors, the traffic from these sets 22 to be monitored can be aggregated, disseminated, or re-routed in the TADU 112 to different and/or multiple monitors 114.

The TADU 112 may be an embedded network device, such as a hub or network switch, that allows for the combination and multi-port monitoring of network traffic. The TADU 112 takes the secured traffic from shadowing units 108, and is operable to merge multiple inbound ports into a combined flow of traffic that can then be transmitted from the SEND device at one or more outbound ports. The monitors 114 may be network "sniffers", protocol analyzers, intrusion detection systems, network forensics systems, or other network analysis systems, which can then provide a full view of the aggregated network data or of various combinations of the network data streams.

Figure 3:
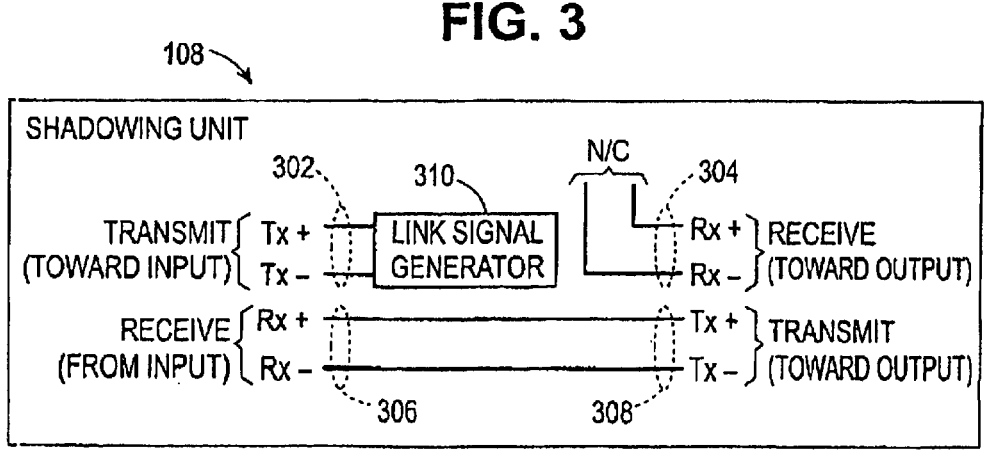
FIG. 3 is a more detailed block diagram of circuitry within a shadowing unit, which allows network traffic to pass only in one direction through it.

FIG. 3 is a more detailed block diagram of circuitry within the shadowing unit 108. The shadowing unit 108 operates to pass data through in one direction, but not the other. Thus, once a datastream is mirrored by the tap 106, the shadowing unit 108 allows that datastream to pass through it toward the monitor 114. The shadowing unit 108 simultaneous keeps hackers from being able to detect the presence of the downstream monitors 114 and/or get data from such monitors 114 or from any other equipment on the downstream side of the shadowing units 108.

The shadowing unit 108 operates in this embodiment by physically disconnecting the input-side "transmit" signal lines 302 from the output-side "receive" signals 304; thus, there is no return path for any data from the downstream side of the shadowing unit 108. The receive datastream, however, is received on the input-side "receive" signals 306 and passed on to the downstream side of the shadowing unit 108 through the output-side "transmit" signals 308. There are a number of options for handling the uncoupling of the input-side "transmit" signals 302 from the output-side "receive" signals.

The embodiment of FIG. 3 provides a link signal generator 310, which can spoof external network equipment into thinking that the connection to the downstream side of the shadowing unit 108 is intact. Alternatives would be to leave these input-side "transmit" signals 302 disconnected, just as is shown for the output-side "receive" signals 304. Rather than leaving the signals physically "open" as shown in FIG. 3, it may be desirable to terminate them to avoid reflections being introduced into the signal lines from the open circuits. Terminators having impedances matched to the signal lines can accordingly be used to diminish potential signal reflections.

Figure 4A:
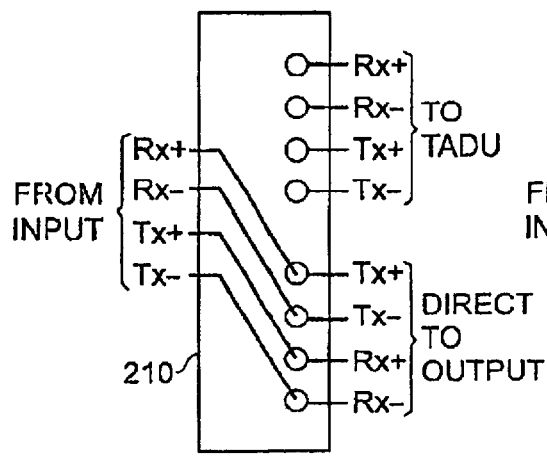
FIGS. 4A–4B illustrate internal diagrams of the functional switching to be provided in a bypass controller within a SEND device embodiment such as shown in FIG. 2.
Figure 4B:
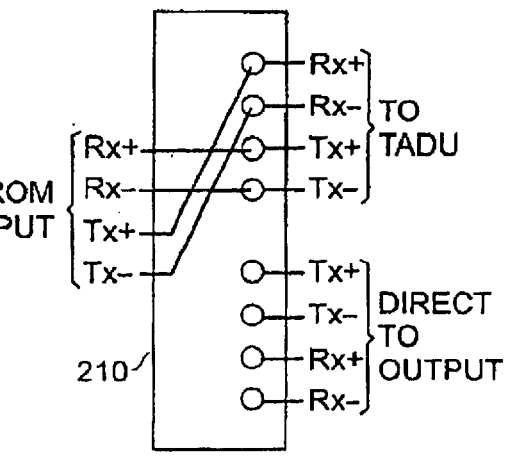

FIGS. 4A–4B are internal diagrams of the functional switching to be provided in an embodiment of a TADU Bypass Controller 210. From the input side, the two "transmit" signals and the two "receive" signals are either sent directly to the monitor connections 22 (FIG. 4A) or to the TADU 112 (FIG. 4B). When they are sent to the TADU 112, the bypass controller 210 in this embodiment provides a built-in crossover such that the appropriate connections are made to the TADU 112.

Figure 5A:
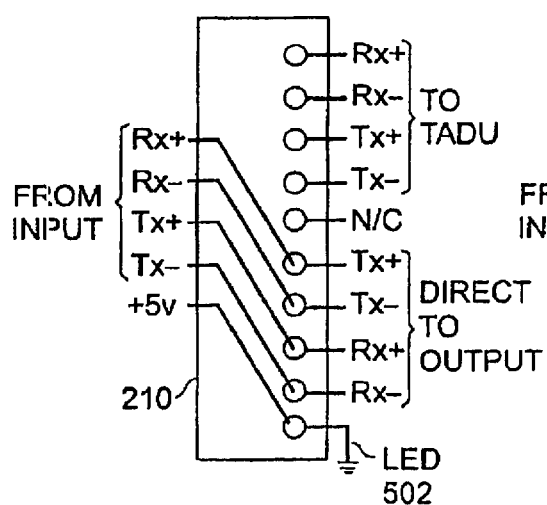
FIGS. 5A–5B illustrate internal diagrams of the functional switching to be provided in a bypass controller within another SEND device embodiment.
Figure 5B:
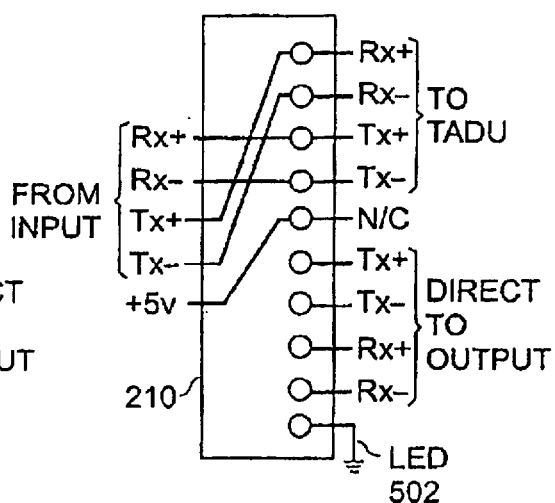

FIGS. 5A–5B are internal diagrams of the functional switching to be provided in an embodiment of a TADU Bypass Controller 210. As was the case for FIGS. 4A–4B, the input signals are either sent directly to the monitor connections 222 (FIG. 5A) or to the TADU 112 (FIG. 5B). The bypass controller 210 here again provides a built-in crossover such that the appropriate connections are made to the TADU 112. The difference in this embodiment is that an LED indicator is provided to show when the TADU 112 is being bypassed for a particular set of signals. As is shown, a power (+5V) connection is provided as a fifth signal line that is switched between a No-Connect (N/C), when the signals are being provided to the TADU 112 (FIG. 5A), or an LED, when the signals are being provided directly to the output (FIG. 5B). Accordingly, the LED is turned "ON" when the signals are bypassing the TADU 112.

Further to FIGS. 4A–4B and FIGS. 5A–5B, the built-in crossover is included to adapt the bypass controller 210 to connect to either a terminal device via the monitor connection 222 or a network connection for the TADU 112. Specifically, for network devices the transmit signals are expected on certain pins and the receive signals are expected on certain other pins. For terminal devices the transmit signal pin locations and the receive signal pin locations are switched relative to the network devices. The built-in crossover gives the bypass controller 210 the flexibility to connect to either a network device (TADU 112) or a terminal device (monitor connection 222).

The embodiments described above are illustrative examples of the present invention and it should not be construed that the present invention is limited to these particular embodiments. For example, although the systems, devices, and methods described above are discussed in the context of providing a secure connection for network monitoring to detect hackers, the above-described embodiments can be employed in other situations in which secure connections are desired. Thus, network monitoring connections or other one-way connections can be implemented that are preferably undetectable to external hackers or external network equipment or servers.

The use of quotation marks with certain expressions such as "receive" signals and "transmit" signals have been used to promote readability of the text/labels for various components and signals described above. No special meaning should be inferred by the use of these quotation marks, and no special meanings should be afforded relative to uses of these terms in the specification where the quotation marks were not used.

Various changes and modifications may be effected by one skilled in the art in implementing the above-described embodiments without departing from the spirit or scope of the invention as defined in the appended claims. Applicants intend that none of the following claims invoke the application of 35 U.S.C. § 112 ¶6 unless they are written in "means-plus-function" or "step-plus-function" format.

What is claimed is:

1. Data network equipment comprising:
   a) a network connection operable to receive a network data signal from a network;
   b) a shadowing unit operable to receive a copy of the network data signal from the network connection and to pass the copied network data signal on to outside the network without allowing data transmissions back toward the network connection through the shadowing unit;
   c) a bypass controller having first and second outputs, the bypass controller operable to receive the copied network data signal from the shadowing unit and to provide the copied network data signal at its first or its second output;
   d) a traffic aggregation/dissemination unit operable to receive copied the network data signal from the first output of the bypass controller and to provide at its output an aggregated or disseminated data signal;
   e) a monitoring connection operable to receive the aggregated or disseminated data signal from the output of the aggregation/dissemination unit and the copied network data signal from the second output of the bypass controller and to provide those data signals as an output from the data network equipment.

2. The data network equipment of claim 1 and further comprising a tap interposed between the network connection and the shadowing unit, the tap operable to output a tapped data signal that comprises at least a portion of the network data signal while leaving the network data signal substantially unaffected, wherein the tapped data signal is provided to the bypass controller in lieu of the copied network data signal.

3. The data network equipment of claim 1 wherein the aggregation/dissemination unit is operable to disseminate the copied network data signal through the monitoring connection to multiple instances of network monitoring equipment.

4. The data network equipment of claim 1 wherein the aggregation/dissemination unit is operable to aggregate multiple copied network data signals and to provide that aggregation to at least one instance of network monitoring equipment.

5. The data network equipment of claim 1 wherein the aggregation/dissemination unit is operable to both aggregate multiple copied network data signals to at least one instance of network monitoring equipment and disseminate at least one copied network data signal to multiple instances of network monitoring equipment.

6. The data network equipment of claim 1 wherein the bypass controller includes a built-in crossover by which it is operable in one state to connect the copied network data signal to the monitoring connection as a terminal device and in another state to connect the copied network data signal to the aggregation/dissemination unit as a network device.

7. The data network equipment of claim 6 wherein the bypass controller further includes an indicator of whether the aggregation/dissemination unit is being bypassed by the bypass controller.

8. A computer network comprising:
   a) a computer network element, the computer network element operable to receive and transmit network data on the computer network;
   b) a tap that is adjacent to the computer network element, wherein the tap is operable to receive a network data signal from the computer network element and to output a tapped data signal that comprises at least a portion of the network data signal while leaving the network data signal substantially unaffected;
   c) a shadowing unit operable to receive the tapped data signal from the tap and to pass the tapped data signal on to outside the network without allowing data transmissions back toward the tap through the shadowing unit;

d) a bypass controller having first and second outputs, operable to receive the tapped data signal from the shadowing unit and to provide the tapped data signal at its first or its second output;
e) a traffic aggregation/dissemination unit operable to receive the tapped data signal from the first output of the bypass controller and to provide at its output an aggregated or disseminated tapped data signal;
f) a monitoring connection operable to receive the aggregated or disseminated tapped data signal from the output of the aggregation/dissemination unit or the tapped data signal from the second output of the bypass controller and to provide those data signals as monitoring signals; and
g) network monitoring equipment operable to receive the monitoring signals from the monitoring connection and to process the received monitoring signals for use in network analysis.

9. The network of claim 8 and further comprising at least another tap that is operable to receive another network data signal from another location within the computer network and to output another tapped data signal that comprises at least a portion of the another network data signal.

10. The network of claim 9 and further comprising another shadowing unit operable to receive the another tapped data signal and to pass the another tapped data signal on without allowing data transmissions back toward the another tap through the another shadowing unit.

11. The network of claim 10 and further comprising another bypass controller having first and second outputs, operable to receive the another tapped data signal from the another shadowing unit and to provide the another tapped data signal at its first or its second output, wherein the traffic aggregation/dissemination unit is further operable to receive the another tapped data signal from the first output of the another bypass controller and to provide at its output the aggregated or disseminated tapped data signal, wherein the aggregated or disseminated tapped data signal comprises an aggregation of the tapped data signal and the another tapped data signal.

12. The network of claim 11 wherein the bypass controller and the another bypass controller are the same unit, whereby the same bypass controller is operable to receive the tapped data signal and the another tapped data signal and to provide both of those tapped data signals either to the traffic aggregation/dissemination unit or to the monitoring connection.

13. The network of claim 12 wherein the bypass controller is operable to provide the tapped data signal and the another tapped data signal to the traffic aggregation/dissemination unit independently of each other.

14. A computer network comprising:
a) a first firewall;
b) a second firewall;
c) a first tap located outside the network space defined between the first and second firewalls, the first tap providing a first tapped data signal comprising at least a portion of the network traffic on the computer network where the first tap is located;
d) a second tap located in the network space defined between the first and second firewalls, the second tap providing a second tapped data signal comprising at least a portion of the network traffic on the computer network where the second tap is located;
e) a first shadowing unit operable to receive the first tapped data signal from the first tap and to pass the first tapped data signal on to outside the network without allowing data transmissions back toward the first tap through the first shadowing unit;
f) a second shadowing unit operable to receive the second tapped data signal from the second tap and to pass the second tapped data signal on to outside the network without allowing data transmissions back toward the second tap through the second shadowing unit;
g) a bypass controller having at least a first and a second input, operable to provide at least the first tapped data signal and the second tapped data signal to respective bypass or non-bypass outputs depending upon whether or not such data signals are intended to be aggregated/disseminated;
h) an aggregation/dissemination unit operable to receive the non-bypassed ones of the first and second tapped data signals and to aggregate or disseminate those data signals into fewer or more signal paths for monitoring;
i) a monitoring connection operable to receive the aggregated or disseminated data signals from the aggregation/dissemination unit and the bypassed ones of the first and second tapped data signals and to provide an external connection to those signals.

15. A method of monitoring a data network comprising:
a) receiving at a network connection a network data signal;
b) tapping the network data signal in order to generate a tapped network data signal comprising at least a portion of the network data signal, while leaving the network data signal substantially unaffected;
c) passing the tapped network data signal to outside the network through a shadowing unit;
d) disabling in the shadowing unit any return path that would allow data transmissions back from the shadowing unit's input toward the network;
e) selectively routing the tapped data network signal to a traffic aggregation/dissemination unit or to a monitoring output;
f) aggregating or disseminating the tapped data network signal if the tapped data network is routed to the aggregation/dissemination unit; and
g) providing the output of the aggregation/dissemination unit to the monitoring output.

16. The method of claim 15 and further comprising monitoring the tapped data network signals and the aggregated/disseminated tapped data network signals at the monitoring output.

17. The method of claim 16 wherein the monitoring equipment comprises a plurality of network monitors and wherein the tapped data network signal is disseminated by the traffic aggregation/dissemination unit among the plurality of network monitors.

18. The method of claim 16 wherein the monitoring equipment comprises at least one network monitor that receives an aggregation of tapped network data signals from the traffic aggregation/dissemination unit.

* * * * *